C. H. & F. LOGAN.
Markers, Seed-Planters, and Cultivators.
No. 145,220.  Patented Dec. 2, 1873.
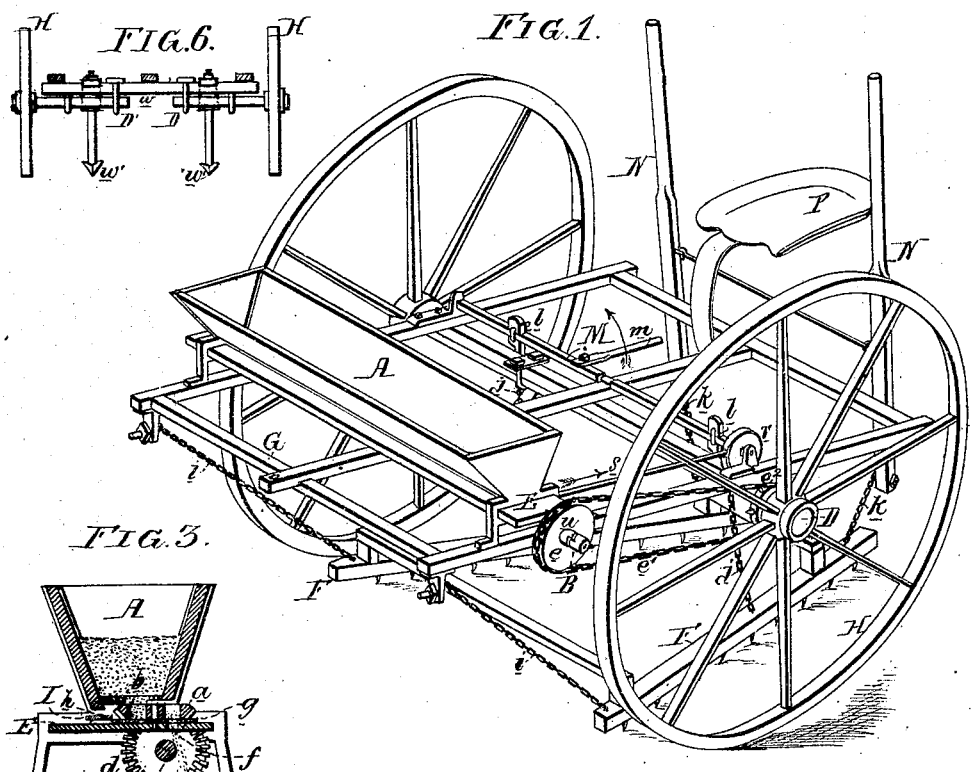
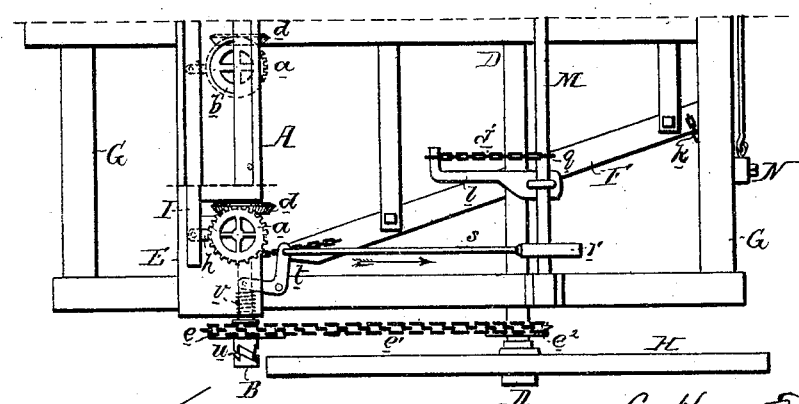
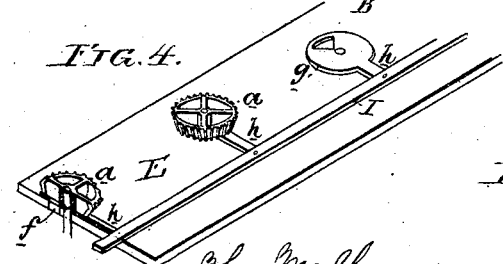
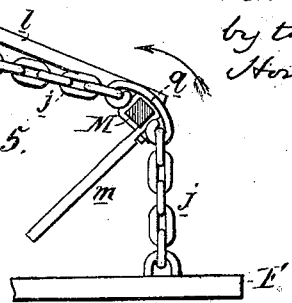
Witnesses, Thos. McIlvain, J. S. Singer
C. H. and F. Logan
by their Attys.
Howson and Son

UNITED STATES PATENT OFFICE.

CHARLES H. LOGAN AND FERDINAND LOGAN, OF PAWLING POST-OFFICE, PENNSYLVANIA.

IMPROVEMENT IN MARKERS, SEED-PLANTERS, AND CULTIVATORS.

Specification forming part of Letters Patent No. 145,220, dated December 2, 1873; application filed June 12, 1873.

*To all whom it may concern:*

Be it known that we, CHARLES H. LOGAN and FERDINAND LOGAN, both of Pawling Post-Office, Chester county, Pennsylvania, have invented a Combined Furrow-Marker, Seed-Planter, and Cultivator, of which the following is a specification:

The object of our invention is to combine in one efficient machine a furrow-marker, seed-planter, and cultivator; and this object we attain by constructing the machine as illustrated in the perspective view, Figure 1, of the accompanying drawing, the wheels H H being adjustable toward and from each other, and serving as guides in marking the furrows by means of plows or scrapers secured to the frame of the machine, while, when used as a planter, the seed is placed in a hopper, A, and drops through openings in the bottom of the same into recesses in a series of horizontal distributing-wheels, driven from a transverse shaft, B, which receives its motion from the hub of the wheel H, the said wheels carrying the seed round to the back of the hopper, and dropping it through a series of openings in a cross-piece, E, the seed being raked into the ground and covered by a harrow, F, suspended from the frame of the machine, and capable of being raised at the pleasure of the operator. This harrow may also be used, independently of the planting devices, as a cultivator.

Our invention will be fully understood from the following detailed description of its construction and operation.

An open frame, G, is secured to the axle D D', (see Figs. 1 and 2, and reduced transverse section, Fig. 6,) and to clamps or other suitable adjusting devices on the cross-rail $w$, Fig. 6, are secured arms or bars carrying two or more plows or scrapers, $w'$, Fig. 6, for marking out the furrows. These plows are adjustable laterally to any distance apart from each other, and the axle D D' is also made in two sections, so that it can be adjusted longitudinally, in order to bring the wheels of the apparatus closer together or to spread them apart from each other, as occasion may require.

The rut made by one wheel in traversing a field in one direction serves as a path for the same wheel in traversing in the reverse direction, so that by this means, and the above-described adjustment of the wheels and plows, parallel furrows can be accurately marked at any required distance apart. For instance, supposing that the wheels H H are eight feet apart, and that the plows are four feet apart and at a distance of two feet each from their respective wheels, it follows that, when the machine is turned after traversing in one direction, and guided as above described, two additional furrows must be marked parallel to and at exactly the proper distance from the first.

In the bottom of the hopper A, and directly over a series of horizontal wheels, $a$, are a number of semicircular openings, $b$, through which the seed is dropped into recesses in the said wheels. (See plan view, Fig. 2, and enlarged transverse section, Fig. 3.) The distributing-wheels are driven simultaneously by a series of bevel-wheels, $d$, on a shaft, B, which extends transversely beneath the hopper, and has at one end a chain-wheel, $e$, which, through the medium of a chain-wheel, $e^1$, and chain-wheel $e^2$ on the hub of the wheel H, receives its motion from the latter. (See Figs. 1 and 2.) Beneath the distributing-wheels and hopper is a cross-piece, E, perforated with a number of holes, $f$, the size of which can be regulated, as desired, by means of a series of valves, $g$, (shown in Fig. 3, and in the detached perspective view, Fig. 4,) the said valves being beneath and concentric with the distributing-wheels $a$, and having arms $h$, pivoted to a rod, I, by the simple longitudinal movement of which, in either direction, the whole of the said valves may be simultaneously operated, so as to either enlarge or decrease the size of the openings $f$, through which the seed is dropped from the recesses in the distributing-wheels $a$, the latter, as they are rotated through the medium of the gearing above described, receiving the seed which drops through the holes $b$ in the bottom of the hopper, and carrying the same around to a point opposite the valves $g$ and discharge-openings $f$, through which the seed is dropped onto the ground. After having been dropped, the seed is raked into the ground and covered by a triangular harrow, F, sustained partly by chains $i\,i$ secured to the frame G, partly by chains $j\,j$ attached to arms $l$ of a transverse rock-spindle, M, and partly by chains $k\,k$ attached to two levers, N N, having their fulcrums at the rear of the frame G, and at either side of the operator's seat P. By means of these levers N the harrow may be swung laterally in either direction, at the pleasure of the operator, for the purpose of avoiding stumps and large stones, &c., and for a further purpose, mentioned hereafter; and, by simply lifting an arm or handle, $m$, the operator can turn the rock-spindle M in the direction of the arrow, Figs. 1 and 5, and thus, through the medium of the arms $l$, elevate the harrow clear of the ground, the harrow being sustained, when elevated, by elongated links $q$ of the chains $j\,j$, which overhang and catch upon the spindle M, as shown in the enlarged view, Fig. 5. Simultaneously with the raising of the harrow by the turning of the rock-spindle, an eccentric, $r$, on the latter (see Figs. 1 and 2) draws a connecting-rod, $s$, in the direction of the arrow, and thus turns a bell-crank lever, $t$, in such a direction as to open a clutch, $u$, by which the chain-wheel $e$ is maintained in gear with the shaft B, the motion of the latter and of the distributing-wheels $a$, and the dropping of seed, consequently stopping whenever the harrow is elevated and the clutch opened. When the harrow is lowered, the clutch is thrown into gear by the action of a spring, $r$, Fig. 2, which presses against the hub of the chain-wheel $e$.

When cultivating crops which are planted in rows or hills, the levers N N enable the operator to swing the harrow laterally in either direction, so as to avoid uprooting plants or breaking down such hills or rows as may be slightly out of line.

We claim as our invention—

1. The combination of the cross-bar of the frame, the adjustable wheels H H, and the adjustable clamps, or their equivalents, for carrying the markers, substantially as specified.

2. The combination of the seed-distributing devices, the suspended harrow F, spindle M, and eccentric $r$, operating a clutch, $u$, through the medium of a rod, $s$, and lever $t$, as specified.

3. The combination of the hopper A, its openings $b$, plate E, having openings $f$, and feed gear-wheels $a$, arranged between the plate E and the bottom of the hopper, and operating as specified.

4. The combination, substantially as described, of the rock-spindle M and the chain $l$, having elongated links $q$.

In testimony whereof we have signed our names to this specification in the presence of two subscribing witnesses.

CHARLES H. LOGAN.
FERDINAND LOGAN.

Witnesses:
WM. A. STEEL,
HUBERT HOWSON.